United States Patent
Shimura et al.

(10) Patent No.: US 9,410,588 B2
(45) Date of Patent: Aug. 9, 2016

(54) BRAKING DEVICE

(71) Applicants: Ryota Shimura, Tokyo (JP); Daisuke Yamada, Tokyo (JP)

(72) Inventors: Ryota Shimura, Tokyo (JP); Daisuke Yamada, Tokyo (JP)

(73) Assignees: Kabushiki Kaisha Sonic Ishikawa, Tokyo (JP); Fuji Latex Co., Ltd., Tokyo (JP)

( * ) Notice: Subject to any disclaimer, the term of this patent is extended or adjusted under 35 U.S.C. 154(b) by 0 days.

(21) Appl. No.: 14/400,609

(22) PCT Filed: Mar. 11, 2013

(86) PCT No.: PCT/JP2013/056568
§ 371 (c)(1),
(2) Date: Nov. 12, 2014

(87) PCT Pub. No.: WO2013/175829
PCT Pub. Date: Nov. 28, 2013

(65) Prior Publication Data
US 2015/0136548 A1 May 21, 2015

(30) Foreign Application Priority Data
May 22, 2012 (JP) ................... 2012-116282

(51) Int. Cl.
*F16F 9/53* (2006.01)
*F16D 57/00* (2006.01)
(Continued)

(52) U.S. Cl.
CPC ............ *F16D 57/002* (2013.01); *F16D 63/002* (2013.01); *F16D 2121/28* (2013.01)

(58) Field of Classification Search
CPC .. F16D 63/002; F16D 57/002; F16D 2121/28
USPC ............................................ 188/267.2, 267
See application file for complete search history.

(56) References Cited

U.S. PATENT DOCUMENTS 3,176,809 A * 4/1965 Monroe .................. F16D 37/02
192/12 D
3,962,595 A * 6/1976 Eddens .................. F16D 57/002
188/159

(Continued)

FOREIGN PATENT DOCUMENTS

| JP | 60-162746 | 10/1985 |
| JP | 2005-507061 | 3/2005 |
| WO | WO 03/036120 | 5/2003 |

*Primary Examiner* — Thomas J Williams
*Assistant Examiner* — Mariano Sy
(74) *Attorney, Agent, or Firm* — Cozen O'Connor

(57) ABSTRACT

A braking device capable of generating a larger braking force is provided. The present invention provides a braking device including a housing (10) having a peripheral wall (11), a coil holding unit (20) provided inside the housing (10), a coil (30) held by the coil holding unit (20), a first activation chamber (40) formed between an inner peripheral surface of the peripheral wall (11) of the housing (10) and an outer peripheral surface of the coil holding unit (20) arranged in parallel with the inner peripheral surface, a rotor (60) provided inside of the first activation chamber (40), and a magnetorheological fluid (80) filling an inside of the first activation chamber (40), wherein the inner peripheral surface of the peripheral wall (11) of the housing (10) is at a position farthest from the center of rotation of the rotor (60) in a radial direction in the inside of the housing (10), wherein the rotor (60) is in a cylindrical shape including an outer peripheral surface having a gap between the outer peripheral surface of the rotor (60) and the inner peripheral surface of the peripheral wall (11) of the housing (10) and an inner peripheral surface having a gap between the inner peripheral surface of the rotor (60) and the outer peripheral surface of the coil holding unit (20), and wherein a shearing stress of the magnetorheological fluid (80) acts on the inner peripheral surface and the outer peripheral surface of the rotor (60).

2 Claims, 1 Drawing Sheet

(51) Int. Cl.
   *F16D 63/00*    (2006.01)
   *F16D 121/28*   (2012.01)

(56) References Cited

U.S. PATENT DOCUMENTS

| | | | | |
|---|---|---|---|---|
| 5,842,547 A * | 12/1998 | Carlson | .................. | F16D 55/00 |
| | | | | 188/267 |
| 5,845,752 A * | 12/1998 | Gopalswamy | .......... | F16D 37/02 |
| | | | | 188/267.2 |
| 6,186,290 B1 * | 2/2001 | Carlson | ............ | A63B 21/00845 |
| | | | | 188/161 |
| 7,198,140 B2 * | 4/2007 | Jolly | .................... | F16D 57/002 |
| | | | | 188/267 |
| 7,303,056 B2 * | 12/2007 | Namuduri | .......... | B60G 17/0152 |
| | | | | 188/267.2 |
| 8,397,883 B2 * | 3/2013 | St. Clair | ................ | F16D 57/002 |
| | | | | 188/161 |
| 9,109,654 B2 * | 8/2015 | Hiemenz | ................ | F16F 9/535 |
| | | | | 188/267.2 |
| 2003/0079948 A1 * | 5/2003 | Jolly | ...................... | B62D 5/005 |
| | | | | 188/267 |
| 2005/0253350 A1 * | 11/2005 | Suchta | ............... | B60G 21/0556 |
| | | | | 280/124.106 |
| 2015/0144442 A1 * | 5/2015 | Shimura | ............... | F16D 57/002 |
| | | | | 188/267.2 |

* cited by examiner

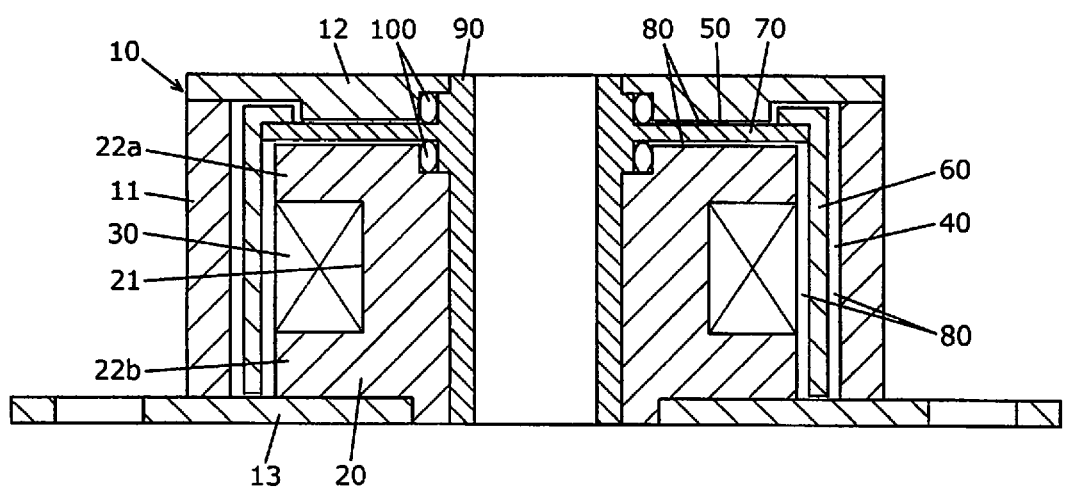

BRAKING DEVICE

PRIORITY CLAIM

This is a U.S. national stage of application No. PCT/JP2013/056568, filed on Mar. 11, 2013. Priority is claimed on Japanese Application No. JP2012-116282, filed May 22, 2012, the content of which is incorporated herein by reference.

TECHNICAL FIELD

The present invention relates to a braking device using a magnetorheological fluid.

BACKGROUND ART

In the past, a braking device is known, which comprises a non-movable body, a movable body capable of rotating inside of the non-movable body, a magnetorheological fluid filled between the movable body and the non-movable body, and a coil configured to generate a magnetic field applied to the magnetorheological fluid.

In this kind of braking device, a shearing stress of the magnetorheological fluid is increased when the magnetic field is applied to the magnetorheological fluid, and the braking device, by making use of the increase of the shearing stress of the magnetorheological fluid, decelerates the rotation speed of the movable body or stops the rotation of the movable body. The magnetic field applied to the magnetorheological fluid is generated by passing an electric current through the coil.

However, in order to cause this kind of braking device to generate a larger braking force, the shearing stress of the magnetorheological fluid is required to be generated at a position further away from the center of rotation of the movable body, and the braking device is required to have a larger surfaces facing each other with the magnetorheological fluid interposed therebetween. For example, Japanese Patent No. 4695835 discloses a braking device using a magnetorheological fluid, but this braking device does not have such structure. Therefore, it used to be difficult to generate a large braking force.

CITATION LIST

Patent Literature

Patent Literature 1: JP 4695835 B1

SUMMARY OF INVENTION

Technical Problem

A problem to be solved by the present invention is to provide a braking device capable of generating a larger braking force.

Solution to Problem

In order to solve the above problem, the present invention provides the following braking device.

1. A braking device comprising:
a housing having a peripheral wall;
a coil holding unit provided inside the housing;
a coil held by the coil holding unit;
a first activation chamber formed between an inner peripheral surface of the peripheral wall of the housing and an outer peripheral surface of the coil holding unit arranged in parallel with the inner peripheral surface;
a rotor provided inside of the first activation chamber; and
a magnetorheological fluid filling an inside of the first activation chamber,
wherein the inner peripheral surface of the peripheral wall of the housing is at a position farthest from the center of rotation of the rotor in a radial direction in the inside of the housing,
wherein the rotor is in a cylindrical shape including an outer peripheral surface having a gap between the outer peripheral surface of the rotor and the inner peripheral surface of the peripheral wall of the housing and an inner peripheral surface having a gap between the inner peripheral surface of the rotor and the outer peripheral surface of the coil holding unit, and
wherein a shearing stress of the magnetorheological fluid acts on the inner peripheral surface and the outer peripheral surface of the rotor.

2. The braking device according to the above item 1, wherein the housing has an end wall, wherein the braking device comprises a second activation chamber formed between the end wall and the coil holding unit and a plate provided inside of the second activation chamber, wherein the plate rotates together with the rotor, wherein the magnetorheological fluid also fills a gap between the end wall of the housing and the plate and a gap between the plate and the coil holding unit, and wherein the shearing stress of the magnetorheological fluid acts on both surfaces of the plate.

3. The braking device according to the above item 1 or 2, wherein the coil holding unit and the peripheral wall of the housing are made of steel-based sintered metal having a density equal to or more than 7 g/cm$^3$.

Advantageous Effects of Invention

In the braking device of the present invention, the inner peripheral surface of the peripheral wall of the housing is at a position farthest from the center of rotation of the rotor in the radial direction in the inside of the housing. The first activation chamber is formed between the inner peripheral surface of the peripheral wall of the housing and the outer peripheral surface of the coil holding unit arranged in parallel with the inner peripheral surface. More specifically, the first activation chamber exists at the outermost side in the housing. On the other hand, the rotor is provided inside of the first activation chamber and is in the cylindrical shape including the outer peripheral surface having the gap between the outer peripheral surface of the rotor and the inner peripheral surface of the peripheral wall of the housing and the inner peripheral surface having the gap between the inner peripheral surface of the rotor and the outer peripheral surface of the coil holding unit. The magnetorheological fluid fills the inside of the first activation chamber, and therefore, the surfaces facing each other with the magnetorheological fluid interposed therebetween include not only the inner peripheral surface of the peripheral wall of the housing and the outer peripheral surface of the rotor but also the outer peripheral surface of the coil holding unit and the inner peripheral surface of the rotor. Therefore, the size of the surfaces facing each other with the magnetorheological fluid interposed therebetween can be increased. In addition, the shearing stress of the magnetorheological fluid acts on the outer peripheral surface and the inner peripheral surface of the rotor. Therefore, according to the braking device of the present invention, a larger braking force can be generated.

BRIEF DESCRIPTION OF DRAWINGS

FIG. 1 is a cross sectional view illustrating an internal structure of a braking device according to an embodiment of the present invention.

DESCRIPTION OF EMBODIMENTS

Hereinafter, an embodiment of the present invention will be explained with reference to drawings, but the technical scope of the present invention is not limited to the contents of the following explanation.
Embodiment
FIG. 1 is a cross sectional view illustrating an internal structure of a braking device according to an embodiment of the present invention. As shown in FIG. 1, the braking device according to the present embodiment comprises a housing 10, a coil holding unit 20, a coil 30, a first activation chamber 40, a second activation chamber 50, a rotor 60, a plate 70, and a magnetorheological fluid 80.

The housing 10 comprises a peripheral wall 11, an end wall 12, and a bottom wall 13. The peripheral wall 11 is of a soft magnetic material, and the shape thereof is a cylindrical shape. The end wall 12 is of a soft magnetic material, and is adhered to one of the end portions of the peripheral wall 11 with an adhesive agent. The bottom wall 13 is made of a non-magnetic material, and is adhered to the other of the end portions of the peripheral wall 11 with an adhesive agent. Examples of adhesive agents include an epoxy-based adhesive agent. When the adhesive agent is used, there is an advantage in that the magnetorheological fluid 80 can be prevented from leaking from the joint portion. It should be noted that it may be possible to integrally form the peripheral wall 11 and the end wall 12. Alternatively, the bottom wall 13 may be constituted by a magnetic material, and the peripheral wall 11 and the bottom wall 13 can be formed integrally.

A hole is formed in the center of the end wall 12 so that one of the end portions of a bearing 90 is inserted into the hole. The bearing 90 is of a soft magnetic material, and has a hole for connection with a shaft. In the present embodiment, the shaft is a constituent element of an object controlled by the braking device, and is not a constituent element of the braking device. Alternatively, a shaft may be employed instead of the bearing 90, and this shaft may be connected with the object controlled by the braking device.

A hole is formed in the center of the bottom wall 13 so that a portion of the coil holding unit 20 is inserted into the hole. The coil holding unit 20 is of a soft magnetic material, and is fixed to the bottom wall 13 using an adhesive agent. Examples of adhesive agent include an epoxy-based adhesive agent. When the adhesive agent is used, there is an advantage in that the magnetorheological fluid 80 can be prevented from leaking from the joint portion. A hole is formed in the center of the coil holding unit 20 so that the bearing 90 is inserted into the hole.

The coil holding unit 20 comprises a cylindrical portion 21, and flanges 22a, 22b extending to the outer side with the cylindrical portion 21 interposed therebetween. The coil 30 is arranged in a space surrounded by the cylindrical portion 21 and the flanges 22a, 22b, and is held by the coil holding unit 20. The coil 30 is connected to lead wires (not shown) for passing an electric current to the coil 30.

The first activation chamber 40 is formed between an inner peripheral surface of the peripheral wall 11 of the housing 10 and an outer peripheral surface of the coil holding unit 20 in parallel with the inner peripheral surface (outer peripheral surfaces of the flanges 22a, 22b). The inner peripheral surface of the peripheral wall 11 of the housing 10 is at the position farthest from the center of rotation of the rotor 60 in the radial direction inside of the housing 10. More specifically, the first activation chamber 40 exists at the outermost position in the housing 10.

The rotor 60 is provided inside of the first activation chamber 40. The rotor 60 is of a soft magnetic material, and the shape of the rotor 60 is a cylindrical shape having an outer peripheral surface having a gap between the outer peripheral surface of the rotor 60 and the inner peripheral surface of the peripheral wall 11 of the housing 10, and an inner peripheral surface having a gap between the inner peripheral surface of the rotor 60 and the outer peripheral surface of the coil holding unit 20. The rotor 60 is connected to the bearing 90 via the plate 70. According to this configuration, the shaft of the object controlled by the braking device rotates, and when the bearing 90 accordingly rotates, the rotor 60 and the plate 70 rotate together. The plate 70 is of a soft magnetic material, and is provided inside of the second activation chamber 50 formed between the end wall 12 and the coil holding unit 20. The first activation chamber 40 and the second activation chamber 50 are in communication with each other. The rotor 60 is fixed to the plate 70 using an adhesive agent. Examples of adhesive agent include an epoxy-based adhesive agent. It should be noted that the rotor 60 and the plate 70 may be integrally formed. Alternatively, a bearing 90 and the plate 70 made of a non-magnetic material may be employed. In this case, the end wall 12 may also be made of a non-magnetic material. According to this configuration, the braking force is mainly generated by the first activation chamber 40.

The magnetorheological fluid 80 is a suspension made by dispersing ferromagnetic particles in a fluid such as synthetic oil, and is in a liquid form in the state of non-magnetic field, and when a magnetic field is applied, dispersed particles connect with each other, so that cross-link structures are formed, and the magnetorheological fluid 80 has such property that the shearing stress increases in accordance with the magnetic field strength. The magnetorheological fluid 80 fills the inside of the first activation chamber 40 and the inside of the second activation chamber 50. More specifically, the magnetorheological fluid 80 fills the gap between the rotor 60 and the peripheral wall 11, the gap between the rotor 60 and the coil holding unit 20, the gap between the plate 70 and the end wall 12, and the gap between the plate 70 and the coil holding unit 20. In the present embodiment, an O ring 100 is provided to prevent the magnetorheological fluid 80 from leaking from the second activation chamber 50.

The coil holding unit 20 and the peripheral wall 11 of the housing 10 are preferably formed with steel-based sintered metal having a density equal to or more than 7 g/cm$^3$. This is because the steel-based sintered metal has a higher magnetic permeability than other sintered metals. In addition, this is because when the coil holding unit 20 and the peripheral wall 11 of the housing 10 are formed with sintered metal and when the density thereof is to be less than 7 g/cm$^3$, the magnetorheological fluid 80 is likely to leak via the coil holding unit 20 and the peripheral wall 11 of the housing 10. When the density thereof is equal to or more than 7 g/cm$^3$, the magnetorheological fluid 80 is reliably prevented from leaking.

The rotor 60 and the plate 70 employed in the present embodiment are of soft magnetic materials. According to this configuration, after the coil 30 is deenergized, the magnetization does not remain in the rotor 60 and the plate 70, and therefore, the rotor 60 and the plate 70 can be rotated freely.

In the braking device configured as described above, when an electric current is provided to the coil 30 via lead wires while the rotor 60 and the plate 70 are rotating, this generates a magnetic field, and this magnetic field is applied to the magnetorheological fluid 80. Accordingly, shearing stress occurs in the magnetorheological fluid 80, so that the rotation speeds of the rotor 60 and the plate 70 can be decelerated, or the rotations of the rotor 60 and the plate 70 can be stopped.

In the braking device according to the present embodiment, the first activation chamber 40 is located at the outermost position in the housing 10. On the other hand, the rotor 60 is provided inside of the first activation chamber 40, and is in the cylindrical shape including the outer peripheral surface having the gap between the outer peripheral surface and the inner peripheral surface of the peripheral wall 11 of the housing 10 and the inner peripheral surface having the gap between the inner peripheral surface and the outer peripheral surface of the coil holding unit 20. The magnetorheological fluid 80 fills the inside of the first activation chamber 40, and therefore, the surfaces facing each other with the magnetorheological fluid 80 interposed therebetween includes not only the inner peripheral surface of the peripheral wall 11 of the housing 10 and the outer peripheral surface of the rotor 60 but also the outer peripheral surface of the coil holding unit 20 and the inner peripheral surface of the rotor 60. Therefore, the size of the surfaces facing each other with the magnetorheological fluid 80 interposed therebetween can be increased. According to this configuration, the shearing stress of the magnetorheological fluid 80 acts on the outer peripheral surface and the inner peripheral surface of the rotor 60, and therefore, a large braking force can be generated.

In the braking device according to the present embodiment, the second activation chamber 50 is formed between the end wall 12 and the coil holding unit 20, and the plate 70 rotating together with the rotor 60 is provided inside of the second activation chamber 50, and the magnetorheological fluid 80 fills not only the gap between the plate 70 and the end wall 12 but also the gap between the plate 70 and the coil holding unit 20. According to this configuration, the surfaces facing each other with the magnetorheological fluid 80 interposed therebetween include one of the surfaces of the plate 70 and the bottom surface of the end wall 12 as well as the other one of the surfaces of the plate 70 and one of the surfaces of the coil holding unit 20. Therefore, the size of the surfaces facing each other with the magnetorheological fluid 80 interposed therebetween can be further increased. In addition, the shearing stress of the magnetorheological fluid 80 acts on both of the surfaces of the plate 70, and therefore, a still higher braking force can be generated.

REFERENCE SIGNS LIST

10 housing
11 peripheral wall
12 end wall
13 bottom wall
20 coil holding unit
21 cylindrical portion
22a, 22b flange
30 coil
40 first activation chamber
50 second activation chamber
60 rotor
70 plate
80 magnetorheological fluid
90 bearing
100 O ring

The invention claimed is:

1. A braking device comprising:
a housing having a peripheral wall and an end wall;
a coil holding unit provided inside the housing;
a coil held by the coil holding unit;
a first activation chamber formed between an inner peripheral surface of the peripheral wall and an outer peripheral surface of the coil holding unit arranged in parallel with the inner peripheral surface;
a second activation chamber formed between the end wall and the coil holding unit;
a rotor provided inside of the first activation chamber;
a plate provided inside of the second activation chamber, wherein the plate rotates together with the rotor; and
a magnetorheological fluid filling an inside of the first and second activation chambers,
wherein the inner peripheral surface of the peripheral wall is at a position farthest from a center of rotation of the rotor in a radial direction in the inside of the housing,
wherein the rotor is in a cylindrical shape including an outer peripheral surface having a gap between the outer peripheral surface of the rotor and the inner peripheral surface of the peripheral wall and an inner peripheral surface having a gap between the inner peripheral surface of the rotor and the outer peripheral surface of the coil holding unit,
wherein the peripheral wall, the end wall, the rotor and the plate are a soft magnetic material respectively, and
wherein a shearing stress of the magnetorheological fluid acts on the inner peripheral surface and the outer peripheral surface of the rotor and both surfaces of the plate.

2. The braking device according to claim 1, wherein the coil holding unit and the peripheral wall are made of steel-based sintered metal having a density equal to or more than 7 g/cm$^3$.

* * * * *